United States Patent [19]
Fürst

[11] Patent Number: 5,998,015
[45] Date of Patent: Dec. 7, 1999

[54] PLASTIC FILM

[75] Inventor: Michael Fürst, Heiligenstadt, Germany

[73] Assignee: 4P Folie Forchheim GmbH, Forchheim, Germany

[21] Appl. No.: 08/751,870

[22] Filed: Nov. 18, 1996

[51] Int. Cl.⁶ .............................. B32B 7/12; B32B 27/32
[52] U.S. Cl. .................. 428/336; 428/216; 428/352; 428/354; 428/920; 428/921
[58] Field of Search .................. 428/41.4, 41.7, 428/41.8, 42.1, 352, 354, 336, 215, 216, 920, 921; 296/39.1, 146.7

[56] References Cited

U.S. PATENT DOCUMENTS 5,707,697  1/1998  Spain et al. ............................... 428/31

*Primary Examiner*—D. S. Nakarani
*Attorney, Agent, or Firm*—Michael J. Striker

[57] ABSTRACT

A plastic film of a polyolefin, particularly polypropylene copolymer has a flame-retardant coating, is siliconized on at least one side and is coated at least to some extent with adhesive in non-siliconized areas, with an intermediate layer formed as a flame-retardant lacquer located between the polyolefin substrate material and the siliconized layer, to be especially suitable for use as a moisture barrier for inner paneling in motor vehicles.

7 Claims, 2 Drawing Sheets

PLASTIC FILM

BACKGROUND OF THE INVENTION

The present invention generally relates to plastic films.

More particularly, it relates to a plastic film which is composed of a polyolefin, in particular polypropylene copolymer.

Plastic films of the above mentioned general time are known in the art. It is advisable to improve these films so that they perform additional functions needed for particular applications.

SUMMARY OF THE INVENTION

Accordingly, it is an object of the present invention to provide a plastic film composed of a polyolefin, which is a further improvement of the existing plastic films.

More particularly, it is an object of the present invention to provide a plastic film which can protect parts it is covering from the formation of condensation and/or against the penetration of moisture.

In keeping with these objects and with others which will become apparent hereinafter, one feature of the present invention resides, briefly stated, in a plastic film which has a substrate layer composed of a polyolefin, a flame-retardant coating provided on the substrate layer, a silicone coating, an adhesive which coats the film at least to some extent in non-siliconized areas, wherein the flame-retardant coating is formed as an intermediate layer of a flame-retardant lacquer located between the polyolefin substrate layer and the silicone coating.

When the plastic film is designed in accordance with the present invention, it forms a reliable barrier to water vapor transmission. The adhesive does not stick to the silicone coating, so that the film can be stacked without any additional intermediate layers (separating layers). As a result, a tremendous reduction in costs and far lower environmental impact than in the case when additional separating films are used, are obtained. The fire prevention requirements made by the automobile industry are also satisfied in a simple and efficient way by the flame-retardant finish of the substrate layer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
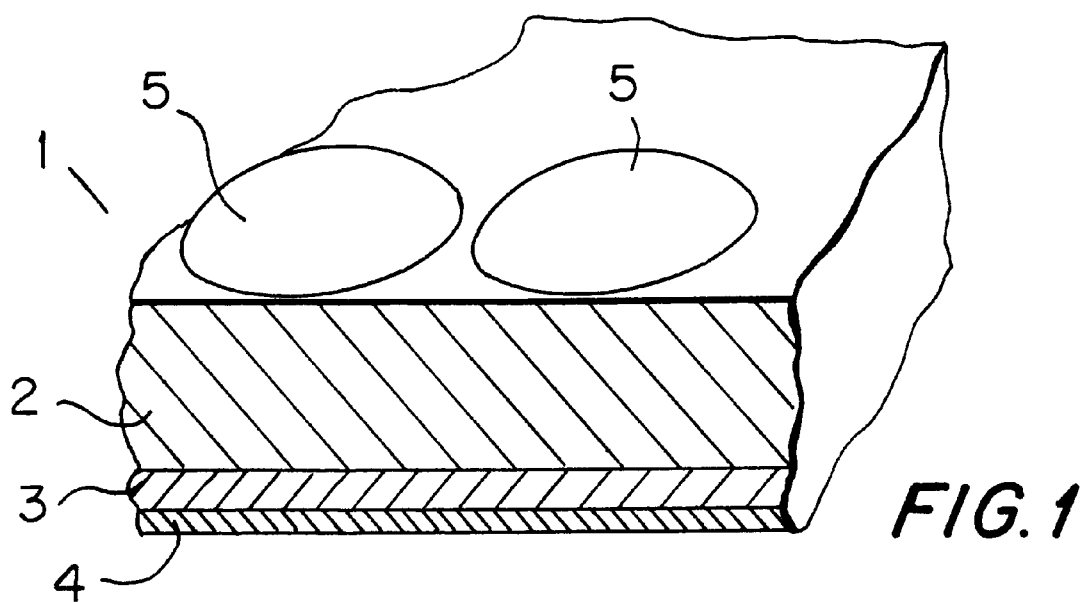
FIG. 1 is a view showing a cross-section through a plastic film in accordance with the present invention.
Figure 2:
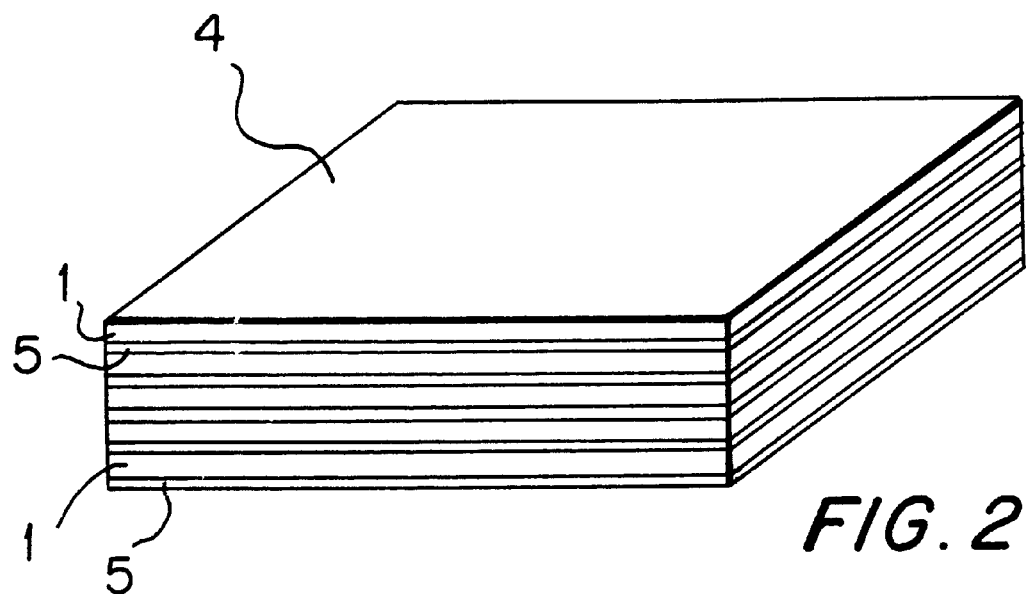
FIG. 2 is a view showing a pile of stacked blanks in accordance with the present invention.

A plastic film in accordance with the present invention is identified as a whole with reference numeral 1. The plastic film has a substrate layer 2 which is composed of a polyolefin, for example of a flame-retardant polypropylene copolymer material. An intermediate layer 3 is located on one side of the substrate layer 2. The intermediate layer 3 is composed of a flame-retardant lacquer. A silicone coating 4 is applied to the surface of the intermediate layer 3 which faces away from the substrate layer 2. An adhesive 5 is provided on the opposite surface of the substrate layer 2. The silicone coating 4 prevents bonding of the adhesive 5. Therefore it is extremely simple for the film to be stacked in the form of finished blanks that have been already coated with the adhesive 5, without any danger of the film blanks sticking together.

The silicone coating 4 can be formed as a silicone layer consisting of silicone and having a thickness of between 0.5 and 2.5$\mu$. The intermediate layer 3 can have a thickness of between 0.5 and 10$\mu$.

In accordance with a further feature of the present invention, the silicone coating 4 and/or the intermediate layer 3 can be composed of a number of individual layers. The layered structure makes it possible to form an overall film that is tailored to the needs of the specific application by combining several individual layers composed from slightly varying materials.

The plastic film in accordance with the present invention can be used preferably as a protection against condensation and/or as a moisture barrier for passenger compartment paneling in motor vehicles. The film effectively stops passenger compartment paneling from becoming moist and thus makes sure that mould etc does not form.

Figure 3:
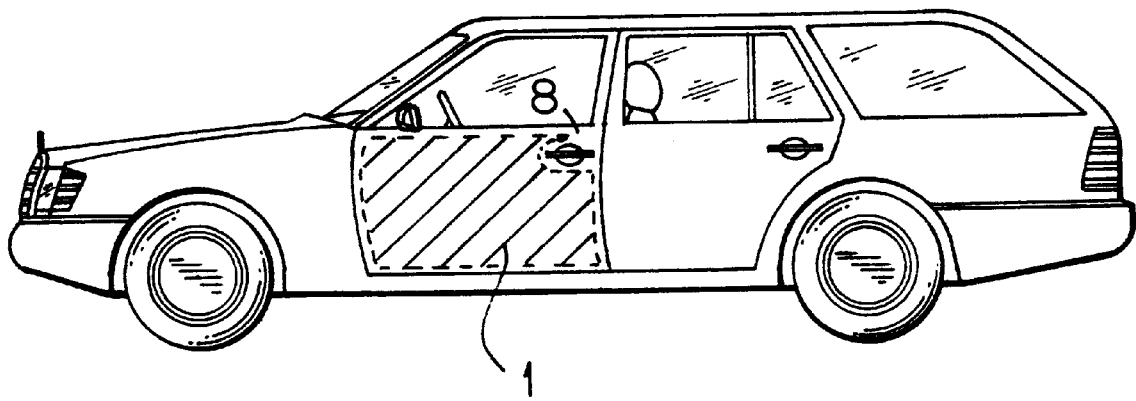
FIG. 3 is a view illustrating one example of a possible use of the film in accordance with the present invention.

The plastic film in accordance with the present invention can be stuck to inside surfaces of sheet metal, with the smallest possible distance being maintained from the inner paneling. One possible application of this plastic film is illustrated in FIG. 3. The plastic film 1 is stuck to the inside of a metal part 8 located inside the vehicle, where it acts a moisture barrier. Penetration of condensation and water to the inside paneling of the door is effectively prevented as a result.

It will be understood that each of the elements described above, or two or more together, may also find a useful application in other types of constructions differing from the types described above.

While the invention has been illustrated and described as embodied in plastic film, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plastic film, comprising a substrate layer composed of a polyolefin; a silicone coating provided on at least one side of said substrate layer; an adhesive provided on an opposite surface of said substrate layer; and an intermediate layer located between said substrate composed of polyolefin and said silicone coating, said intermediate layer being flame-retardent and composed of a flame-retardant lacquer.

2. A plastic film as defined in claim 1, wherein said substrate layer is composed of polypropylene copolymer.

3. A plastic film as defined in claim 1, wherein said silicone coating consists of silicone and has a thickness of between 0.5 and 2.5$\mu$.

4. A plastic film as defined in claim 1, wherein said intermediate layer has a thickness of between 0.5 and 10μ.

5. A plastic film as defined in claim 1, wherein said silicone coating is composed of a plurality of individual layers.

6. A plastic film as defined in claim 1, wherein said intermediate layer is composed of a plurality of individual layers.

7. A plastic film as defined in claim 1, wherein said silicone coating and said intermediate layer are composed of a plurality of individual layers.

* * * * *